Figure 1:
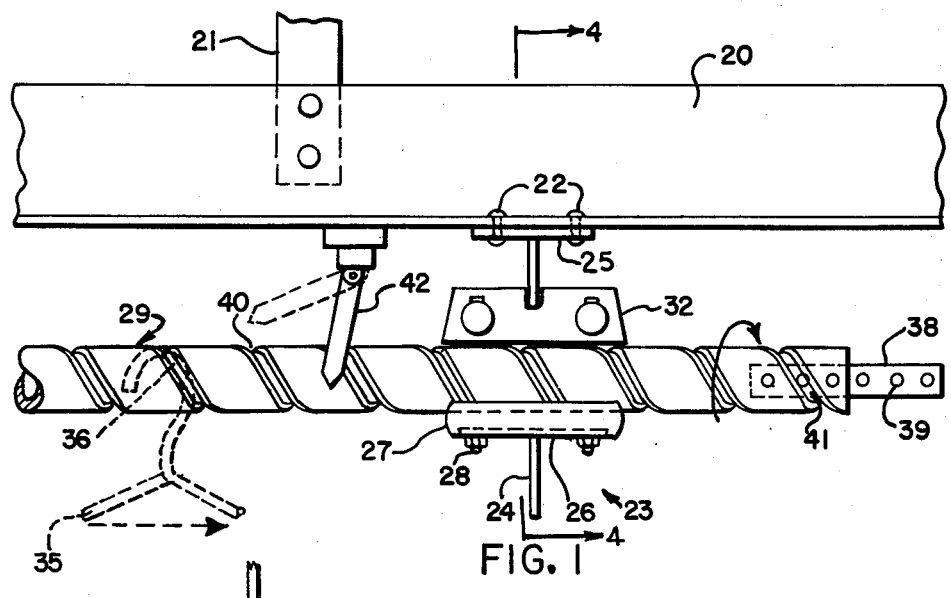

Sept. 15, 1964  M. A. WEISS ETAL  3,148,765
CONTINUOUS SPIRAL TRACK CONVEYOR
Filed March 2, 1962  3 Sheets-Sheet 1

INVENTORS
MORTON A. WEISS
BERNARD S. SPECKHART
BY
ATTORNEY

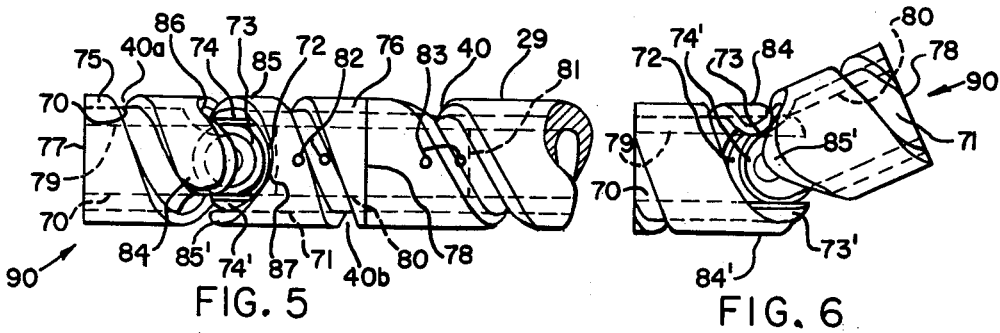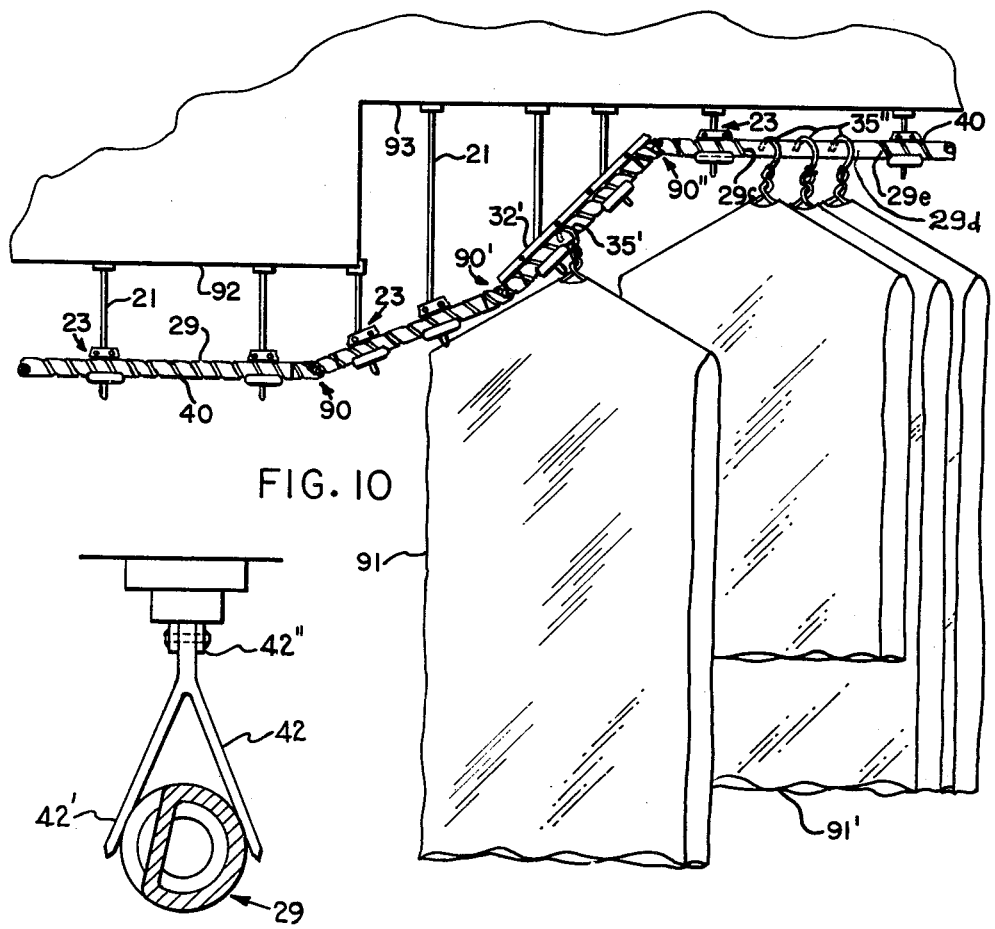

Sept. 15, 1964 M. A. WEISS ETAL 3,148,765
CONTINUOUS SPIRAL TRACK CONVEYOR
Filed March 2, 1962 3 Sheets-Sheet 3
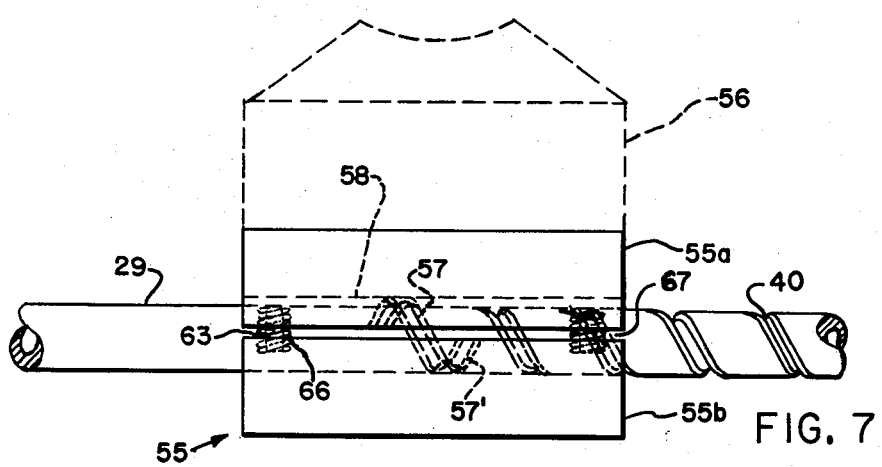
FIG. 7
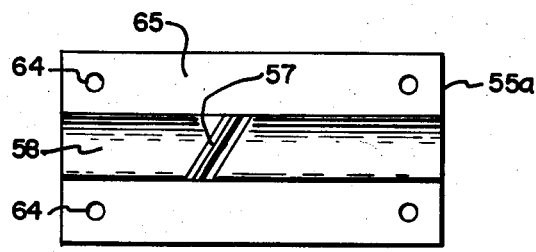
FIG. 8
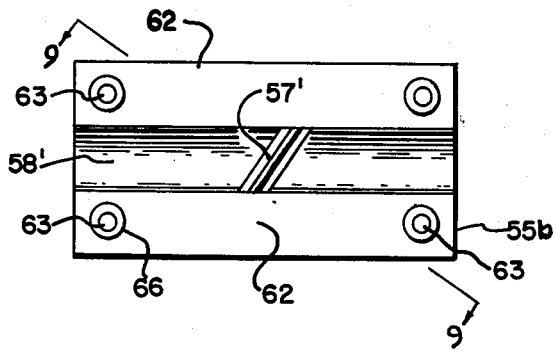
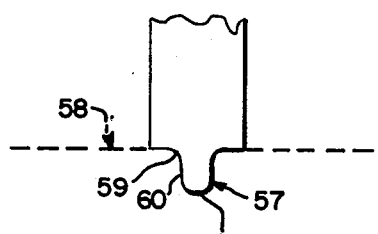
FIG. 9
INVENTORS
MORTON A. WEISS
BERNARD S. SPECKHART
BY
ATTORNEY

United States Patent Office 3,148,765
Patented Sept. 15, 1964

3,148,765
CONTINUOUS SPIRAL TRACK CONVEYOR
Morton A. Weiss, Springfield, and Bernard S. Speckhart, Union, N.J., assignors to White Machine Co., Inc., Kenilworth, N.J., a corporation of New Jersey
Filed Mar. 2, 1962, Ser. No. 177,099
8 Claims. (Cl. 198—213)

This invention relates to a continuous spiral track screw conveyor designed to be suspended from a ceiling or similar location. More specifically, it relates to a hollow tube having a spiral peripheral groove in which are conveyed articles suspended on wire hangers, and suspension means for same, as well as direction-changing means therefor.

Although the conveyor system of the present invention may be employed for transporting numerous types of articles, the conveyance of clothing in dry cleaning establishments will be employed herein as a specific example. This type of conveyance in the latter industry is particularly sensitive to servicing materials, such as lubricants, and the like, which generally find their way as contaminants on the clothes transported. In such industries, garments are moved from one department to another. For example, clothes from the cleaning department are moved to the pressing department and from there to the inspection department, then to the assembly department, and finally to the bagging department. Thus, it is seen that the clothes are transported over considerable distances, and it is extremely essential that cleanliness of conveyance be strictly maintained.

Among the conveyor types presently employed in dry cleaning establishments, one is the roller chain type which requires a return section (which is not required by the conveyor of the present invention). Also, such a chain conveyor generally requires a housing and a lubricant and, in spite of the fact that a housing is employed, clothes become regularly contaminated by the lubricant. Furthermore, it often is not possible to obtain a continuous chain conveyor when change of direction is involved in the conveyor line. Changes in conveyor direction are often required in dry cleaning establishments due to zig-zag location of presses, column or ceiling I-beam interference, and the like. Conveyors of this chain type also are quite expensive and difficult to install.

Another type of conveyor used in the dry cleaning industry is a stranded cable, spirally wound with a spring steel coil, and disposed in a metal trough. In the manufacture of stranded cable, a lubricant is employed and, although the cable for conveyor use is baked to remove the lubricant, it has been found that, after some usage, lubricant does ooze out of the stranded cable, and it eventually contaminates clothes. Among the other disadvantages of such a conveyor unit are the appreciable resistance involved (and consequent increased power needs due to the considerable friction developed because of the rubbing against the trough), the rapid wear of the helix (because of the fact that the entire cable load is carried by the narrow and thin helix edge), difficulty in installation, etc.

Still another type of conveyor in this field is an extruded aluminum trough in which a bare single spiral spring is rotated. This type of unit has met with little success because of the fact that when an area of the conveyor is appreciably loaded, the forward driven portion of the coil tends to wind up, independently of the yet stationary loaded portion, until a torsional force is developed which overcomes the weight of the load and the latter then is propelled in a jerky fashion. Such binding action not only gives irregular movement of the load, but also tends to warp the spring and thus necessitates constant replacement.

Finally, another further type of conveyor, used for similar purposes, consists of a pipe having spot-welded, on its periphery, a spiral steel wire. Among the disadvantages of this form (besides cost) are the difficulty in journalizing, the wearing away of the wire at the bearings, and the inability to make angular or curved changes in direction. Since the entire load of the conveyor is carried by the wire, which occupies only a mere fraction of the load area, there is excessive wear on the supporting areas, and the pipe often hops off its cradle bearing. Thus, in spite of the fact that lubrication is to be avoided in this industry, it has been found to be a necessity in the latter case. Attempts have been made with respect to this type of conveyor to recess the conveyor track into a groove at support-bearing areas. In such cases, the load hanger would leave the raised spiral and drop into a spiral grooved into a solid piece of shafting, but such grooves are expensive to machine. The wire-wound pipe conveyor also is subject to load piling-up difficulties to be discussed further.

A review of the aforesaid conveyor systems points to the fact that they do not fulfill the industry's need for a simple low cost, light, lubricationless, long-life system involving a minimum of friction and maintenance, and designed for easy installation. A conveyor of this type should be adaptable readily to sharp changes in direction, and sections thereof should be easily coupled.

Attempts have been made in the industry to use a grooved solid shaft spiral track for conveying purposes. They have met with failure for a number of reasons mainly because of the excessive weight involved, difficulty in machining the groove, and difficulty in changing direction of load travel. It has been felt that some of the major difficulties thereof could be eliminated by use of a grooved tubing, rather than solid shaft, but these attempts also have met with failure in the past because a machined tubing (besides being expensive) leaves little groove depth for conveying purposes unless excessively heavier walls are employed, and thin groove walls are easily worn out in constant use when ordinary steel tubing is used. Attempts at rolling grooves into tubing also have met with failure because of bending both of wall and of tubing length. Furthermore, since welded seam tubing practically must be used to keep the cost down, mechanical working of the rolling type tends to split the tubing at the seam in too many instances to discourage manufacture by this means.

In the conveyor of the present invention, a relatively thin-walled pipe or tubing (i.e., of about 0.05" to about 0.15" wall thickness) of the welded seam type is employed, thus insuring low weight and low cost. The load-carrying portion of the tubing is a channel or groove. Since this groove occupies only a small fraction of the entire rotating surface, and the tubing portion subjected to the bearing friction effect is the ungrooved or major portion of the surface, the amount of suspension bearing load per unit area of tubing is very small, which is an important factor in a lubrication-less environment. Also, due to the particularly novel method of grooving the tubing of the present invention, wearing out through use and loss of tubing metal through wear in the groove are greatly minimized. In the first place, the thickness of the tubing wall at the groove is almost the same as that of the ungrooved tubing portion. Furthermore, by forming the groove by means of the hammering technique, to be described later, the groove surface is provided with a surface hardness much higher than that of the ungrooved tubing portion, whereby longer useful conveyor life results. For example, when using a welded seam steel tube made from open hearth sheet coil of standard SAE 1010 steel having a Rockwell hardness of 90B, the hammering technique employed in forming the groove in the tube results in a groove hardness of 25 C., which is an increase in hardness of over about 40%, so that a consequent reduction in groove wear is effected by approximately that amount. Since the only wear taking place (outside of that of the bearings) on the conveyor line is the wear of the hanger hooks on the groove surface, and this wear is aggravated by exceedingly high per unit area loads, it is apparent that increase in hardness of at least 25% or more, over that of the original tube metal, is of considerable significance with respect to conveyor life.

Another important feature of the groove sliding surface is the improved smoothness obtained by the aforesaid hammering technique, as contrasted to a surface consisting of parallel radial ridges and burrs obtained with machined solid rods, or with rolled grooves, if they were possible to be made. For example, when the conveyor is made of the aforesaid seam welded SAE 1010 steel, the original tube surface, as sold, has a surface finish of about 16 microinch roughness. Upon hammering in of the groove by the hammering method (to be outlined further), the surface finish of the groove surface is found to have a roughness of only 8 microinches, a reduction in the neighborhood of about 50%. Since no lubrication is employed on the conveyor, and since smoothness and speed of conveyance are proportional to the surface roughness of the metal, it is readily seen that a reduction in surface roughness by at least 25% or more in the groove surface will effect greatly an added efficiency and conveyor groove life.

Figure 2:
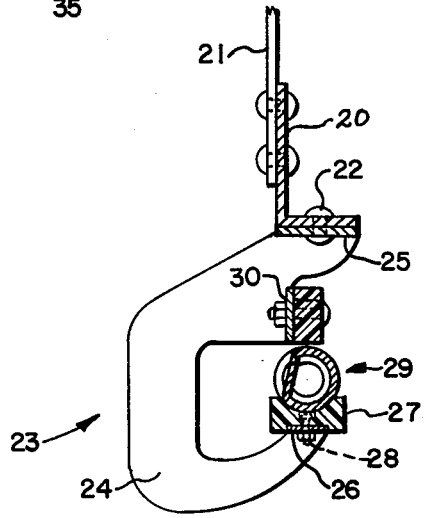
Figure 4:
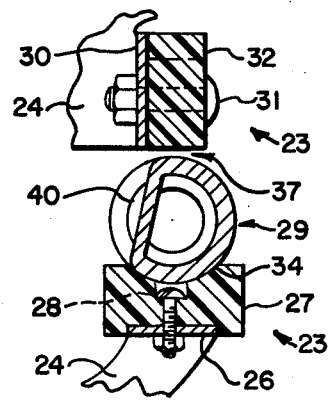
Figure 3:
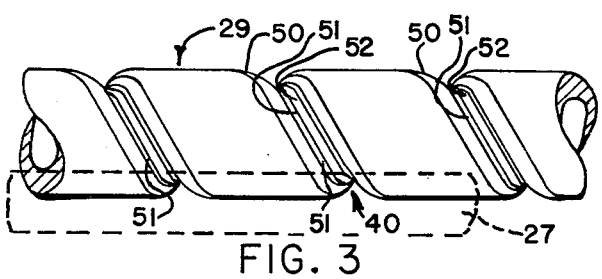

The invention will be more readily understood by reference to the accompanying drawings in which a preferred embodiment is described and in which FIGURE 1 depicts a front elevational view of a preferred embodiment in section form. A side elevational view thereof is presented in FIGURE 2. FIGURE 3 depicts an enlarged front view of a portion of the conveyor tubing resting on a bearing, while FIGURE 4 illustrates a cross-sectional view taken along line 4—4 of FIGURE 1. A side view of a direction-changing joint (in straight position), for the aforesaid conveyor, is depicted in FIGURE 5, while FIGURE 6 presents a side view, taken at right angles to that of FIGURE 5, but in bent position of the same joint. FIGURE 7 illustrates a side view of a press and die, as used in hammering in the spiral groove in the conveyor tubing of the present invention, while FIGURE 8 shows inside views (in open die position) of the top and bottom of the die employed. FIGURE 9 presents a cross-sectional view of the groove-forming portion of the die taken along line 9—9 of FIGURE 8 of the forming die. A front view of a conveyor system of the present invention, as used at different building elevations (with angle iron support omitted) is shown in FIGURE 10. FIGURE 11 illustrates an end view of a conveyor, as in FIGURE 1, showing details of the movable hanger stopper. Similar numerals refer to similar parts in the various figures.

Referring again to the drawings, numeral 20 represents an angle iron which is suspended from a ceiling rafter, for example, by strap 21. Attached to angle iron 20 by bolts 22 is the bearing hanger represented generally by numeral 23. This hanger comprises curved open-front member 24 having its upper portion terminating with plate 25 which is attached to angle iron 20 by bolts 22, and its lower portion terminating with plate 26 to which is attached (by screws 28), the load-carrying bearing 27. Straight conveyor tubing 29 rotates on this bearing 27. Attached to hanger member 24, immediately above and away from the center of tubing 29, is vertically-positioned plate 30 to which is attached, by means of bolts 31, upper auxiliary bearing or guide 32 which is disposed immediately above (but not necessarily in contact with) tubing 29. The lower surface of bearing 32 may be flat and mounted close enough to tubing 29 so as to prevent tubing 29 from slipping out of bearing 27. The upper surface 34 of main bearing 27 is concavely curved to complement the curved periphery of tubing 29 in contact therewith.

Straight tubing 29, serving as the conveyor, is provided with a continuous hammered spiral groove 40. With a 1″ outside diameter tubing, and a 0.093″ wall thickness, for example, a groove of about 3⁄16″ depth can be made by the technique of the present invention, without difficulty and without splitting the seam. To prevent rusting, it is preferable that the tubing be given a plating of corrosion-resistant material, such as tin, prior to hammering. Groove 40, when made by the hammering technique disclosed herein, has a curved upper juncture surface 50, below which is a substantially vertical side 51, terminating at the bottom with a smooth rounded valley 52, which structure is particularly valuable in hanger transmission since it permits hangers to fall smoothly into the groove, but makes it difficult for them to get out of said groove.

Groove 40 is made by placing tubing 29 into a die, indicated generally by 55 (FIGS. 7–8), and subjecting the die to hammering action by a press 56 having a capacity of about 10 tons, more or less. Die 55 consists of upper portion 55a and lower portion 55b. Each of the aforesaid portions has inwardly-projecting forming die portions 57 and 57′ which are disposed at an angle of about 60° with respect to the axis of the tubing, and which project inwardly in die 55 from the inside hemispherical inner walls 58 and 58′ of die 55 for a distance of about 3⁄16″. This forming portion 57 of the die has arcuate juncture portions 59, straight vertical side portions 60, and an arcuate tip portion 61. Lower die 55b is provided at top faces 62 with pins 63 which ride in guide holes 64 of oppositely-disposed faces 65 of the upper die 55a. A helical spring 66 is disposed around pins 63 so as to raise upper die 55a for a space 67 about 1⁄4″ or so between strokes of press 56, so as to enable feeding of tube 29 therethrough. Tubing 29 is fed through die 55 with a forward and turning motion, in the direction of the helical groove 40 produced by the die. When 1″ O.D. tubing is employed, the distances between helix groove centers on tubing 29 is about 1 3⁄8″, using the aforesaid technique.

The problem of changing direction with this type of conveyor has been solved by use of a spiraled universal joint, such as a spiraled ball-and-socket universal joint as depicted in FIGURES 5 and 6 and indicated generally as 90. In the case of a 1″ O.D. conveyor, a standard 7⁄8″ O.D. ball-and-socket joint with ends 70 and 71 and having ball 72 pinned at right angles between socket prongs 73–73′ and 74–74′ respectively, is employed. In this joint, a pin is mounted at the knuckle between socket ends 73 and 73′ (the pin passing through ball 72 disposed therebetween). Another pin is mounted between socket ends 74 and 74′ (with ball 72 therebetween). Over each joint end 70 and 71 is slipped a substantially flat helical sleeve 75 and 76, respectively, of, say 1⁄8″ thickness, the helix thereof having the same pitch as groove 40 of tubing 29, and joining therewith at junctures 77 and 78, respectively, of the joint ends with the tubing ends. Joint ends 70 and 71 have hollow openings 79 and 80, respectively (say of 1⁄2″ diameter), into which may be inserted inner cylindrical couplings, such as coupling 81, which is fastened to joint end 71 and tubing 29 by pins 82 and 83, respectively. Sleeves 75 and 76 terminate at the socket ends and over the knuckle, such as over a portion of the ball 72, with bifurcated rounded and chamfered sleeve ends 84–84′ disposed over socket ends 73–73′, respectively, and sleeve ends 85–85′ disposed over socket ends 74–74′, respectively, the sleeve portions 86 and 87 between the respective bifurcations being rounded to serve as part of the helical transportation path. Projecting edges of socket prongs 73–73′ and 74–74′ are rounded off at helix portions to facilitate travel of hangers thereover. From the foregoing, it can be seen (FIGS. 5–6), therefore, that as a hanger enters groove 40a of sleeve 75, it rides on joint end 70 and passes rounded terminal furcation 84 of sleeve 75, then it passes over a portion of ball 72 and past terminal furcation 85′ of sleeve 76, then past furcation 84' of sleeve 75 and over the remaining portion of ball 72, whereupon it begins to ride on joint end 71, passing terminal furcation 85 of sleeve 76. After completion of its ride in groove 40b, the hanger enters groove 40 of tubing 29.

When used with a grooved tubing 29 of 1" O.D., socket joint 71 may be ⅞" O.D., with inner opening 70 of ½". Sleeves 75–76 are preferably ⅛" in thickness at the knuckle, although this may be tapered down to 1/16" at the ends, and the width of groove 40a is about 3/16". One advantage of this type of direction-changing joint is that it is rigid, rather than flexible (as in the prior art). For this reason, torque is transmitted positively, rather than yieldingly, and the inherent difficulties of the latter are thus avoided.

Tubing 29 is provided at its end with a driving gear or belt-driven pulley (not shown), which is coupled to a motor (not shown). Hangers on which pressed clothes are transported, for example, such as hanger 35, are hung on tubing 29 by engaging their hooks (e.g., hook 36) onto the tubing's groove 40. Thus, when tubing 29 is rotated in the direction of the solid arrow (FIG. 1), the hangers will move and be conveyed easily and swiftly in the direction of the broken arrow. Reversal of the direction of rotation of tubing 29 will reverse the direction of travel of the hangers. Although a space 37 of about 0.005" is provided between tubing 29 and upper bearing on guide 32, it is usually unnecessary to provide for hook clearance because groove 40 can be made deep enough to bury hook 36 within said groove. For example, with a 1" O.D. tubing of 0.093" wall thickness, a 3/16" depth groove can be hammered in readily, providing a depth well in excess over the thickness of the hanger hooks. Tubing lengths are conveniently made in 10' straight sections, and sections may be readily joined by means of inner coupling 38 (FIG. 1) provided with, say two or three threaded holes 39, on each end to receive Allen type set screws 41 or pins which hold tightly the joined tubing sections onto coupling 38. Such coupling of sections is not possible readily with present conveyors, like those of the cable type. The hole 39 and set screws 41 also serve as aligning means to insure aligned continuity of groove 40 from one tubing section to another.

Bearings 32 and 27 preferably are made of a hard "self-lubricating" thermoplastic material such as nylon, polyacetal of the type sold commercially under the tradename "Delrin," or the like.

By use of the conveyor of the present invention, it is possible to readily stop the travel of hangers at any point by inserting into the groove a stop, such as forked stop 42 (FIG. 1) mounted on channel 20, which stop may be swiveled out of stopping position, as indicated by the broken lines. As shown in FIGURE 11, when stop 42 is lowered at swivel 42" to straddle conveyor tubing 29, fork 42 engages the hook end 36 of the first hanger 35 and stops it from traveling further on the conveyor. Then, succeeding hangers merely stop against the previously stopped hanger, and this continues until stop 42 is raised out of operating position, as in FIGURE 1. Such an operation is not possible with conventional conveyors, such as the wire spiral welded on pipe, because of the protruding wire obstructs in-line slipping of the hangers, whereby the hangers then tend to pile up over each other and create a jamming in that area.

Transportation of clothing 91, 91' on hangers 35', 35", at different levels, using the conveyor of the present invention, is illustrated in FIGURE 10. Tubing 29 having groove 40 is mounted on hangers 21 attached to a ceiling 92 of one level. With joint 90, it is possible to effect a rise of 22½°, so that, to effect a 45° rise from ceiling level 92 to 93, only two joints 90 and 90' need be employed. When a rise of over 24°, more or less, is required, there is a tendency for hangers to slip out of the grooves as they ride over the rotating conveyor 29. In such a case of extreme angulation, a long upper bearing or guide 32' is employed for the entire length of the excessively angulated conveyor. When this guide is used, it holds hangers 35' in place and prevents them from sliding down the conveyor. Use of the present system can be made to provide a clothing storage area, such as that used for clothing 91'. In this case, groove 40 is gradually terminated at 29c, so that hangers 35" pile up against each other on grooveless tubing 29d. In this manner, clothing will abut each other and push the stored clothing 91' until they reach grooved tubing 29e, whereupon they begin to be transported further by the conveyor.

From the foregoing, it is apparent that the conveyor of the present invention affords many advantages over those now in use, while overcoming their disadvantages. Furthermore, a surprising result is that the conveyor of the present invention is cheaper than those in use already outlined.

We claim:

1. A screw conveyor for transporting hangers, comprising
   a straight, tubular, thin-walled shaft, and
   a smooth, continuous narrow helical groove hammered into the periphery of said shaft and disposed inwardly of the tube wall surface and having a depth greater than the thickness of the tubular wall and greater than the height of a hanger to be contained therein and transported thereon, said groove having a rounded juncture with the remaining surface of said shaft, and having a straight side substantially vertical with respect to the axis of said shaft, and having a rounded bottom, and having a surface of at least 25% greater hardness and smoothness than those of the remaining surface of said shaft.

2. A screw conveyor for transporting load hangers, comprising
   a plurality of lengths of straight, tubular, thin-walled shafts,
   a continuous narrow helical groove in the peripheries of said shafts and disposed inwardly of the tube wall surfaces and having a depth greater than the height of a hanger to be contained therein and transported thereon, and
   at least one coupling joined to at least two adjacent ends of said lengths and designed to change the direction of conveyance, said coupling comprising a two-piece universal joint having socket ends swivelly mounted at the knuckle of said joint, said joint having a diameter smaller than that of said lengths, each piece of said joint being covered by a sleeve forming a helical slot serving as a continuation of the helical grooves on said lengths, each sleeve terminating in a bifurcation with one furcation thereof superimposed over each socket end of its respective piece, and arranged in a manner such as to permit a load hanger riding in the groove of one of said lengths to glide onto said coupling and ride in said slot, then ride past one furcation of one sleeve end, then over a portion of the knuckle and past a furcation of another sleeve end, then past another furcation of said one sleeve end, over the remaining portion of the knuckle, and past the other furcation of said second sleeve end, and into the slot of said second piece and into the groove of another length.

3. A screw conveyor for transporting load hangers comprising
   a plurality of lengths of straight, tubular, thin-walled shafts,
   a continuous narrow helical groove in the peripheries of said shafts and disposed inwardly of the tube wall surfaces and having a depth greater than the height of a hanger to be contained therein and transported thereon, and
   at least one coupling joined to at least two adjacent ends of said lengths and designed to change the direction of conveyance, said coupling comprising a two-piece universal ball-and-socket joint having socket ends swivelly mounted over the ball of said joint, said joint having a diameter smaller than that of said lengths, each piece of said joint being covered by a sleeve forming a helical slot running over said piece and serving as a continuation of the helical grooves on said lengths, each sleeve terminating in a bifurcation with one furcation thereof superimposed over each socket end of its respective piece over the ball, and arranged in a manner such as to permit a load hanger riding in the groove of one of said lengths to glide onto said coupling and ride in said slot, then ride past one furcation of one sleeve end, then over a portion of the ball and past a furcation of another sleeve end, then past another furcation of said one sleeve end, over the remaining portion of the ball, and past the other furcation of second sleeve end, into the slot of second piece and into the groove of another length.

4. A screw conveyor for transporting load hangers, comprising
   a plurality of lengths of straight, tubular, thin-walled shafts,
   a continuous narrow helical groove in the peripheries of said shafts and disposed inwardly of the tube wall surfaces and having a depth greater than the height of a hanger to be contained therein and transported thereon, and
   at least one coupling joined to at least two adjacent ends of said lengths and designed to change the direction of conveyance, said coupling comprising a two-piece universal joint having socket ends swivelly mounted at the knuckle of said joint, said joint having a diameter smaller than that of said lengths, and a sleeve disposed on each joint piece and forming a helical slot serving as a continuation of the helical grooves on said lengths, each sleeve terminating at the knuckle of said joint.

5. A screw conveyor for transporting hangers, comprising,
   a straight, tubular, thin-walled shaft, and
   a continuous, narrow, helical groove hammered into the periphery of said shaft and disposed inwardly of the tube wall surface and having a depth greater than the thickness of the tubular wall and greater than the height of a hanger to be contained therein and transported thereon.

6. A screw conveyor for transporting hangers, comprising,
   a straight, tubular, thin-walled shaft, and
   a continuous, narrow, helical groove hammered into the periphery of said shaft and disposed inwardly of the tube wall surface and having a depth greater than the thickness of the tubular wall and greater than the height of a hanger to be contained therein and transported thereon, the steel in the surface of said groove having a higher hardness than that of the steel in the remaining surface of said shaft.

7. A screw conveyor for transporting hangers, comprising,
   a straight, tubular, thin-walled shaft, and
   a smooth, continuous, narrow, helical groove hammered into the periphery of said shaft and disposed inwardly of the tube wall surface and having a depth greater than the thickness of the tubular wall and greater than the height of a hanger to be carried therein and transported thereon, said groove having a surface at least 25% greater in hardness and smoothness than those of the remaining surface of said shaft.

8. A screw conveyor for transporting hangers, comprising,
   a multiplicity of straight, tubular, thin-walled shafts,
   a continuous, narrow, helical groove hammered into the peripheries of said shafts and disposed inwardly of the tube wall surfaces and having a depth greater than the thickness of the tubular walls and greater than the height of a hanger to be contained therein and transported thereon,
   cylindrical couplings fitting partially into the ends of some of said shafts with remaining portions thereof fitting completely into the ends of axially-adjacent other shafts in a manner such as to be completely concealed within said shafts,
   aligning means on said couplings and co-acting aligning means on the ends of said shafts serving to keep said groove in continuous helical alignment on said shafts, and
   fastening means for fastening said couplings to said shafts.

References Cited in the file of this patent
UNITED STATES PATENTS

| | | |
|---|---|---|
| 1,274,956 | Taliaferro | Aug. 6, 1918 |
| 2,599,615 | Dahlberg | June 10, 1952 |
| 2,620,917 | Dahlberg | Dec. 9, 1952 |
| 2,830,695 | Fennimore | Apr. 15, 1958 |
| 2,842,258 | Rupp | July 8, 1958 |